Dec. 14, 1926.
W. J. BAUMGARTNER
1,610,917
ENGINE VENTILATING DEVICE
Filed Jan. 26, 1925    2 Sheets-Sheet 2
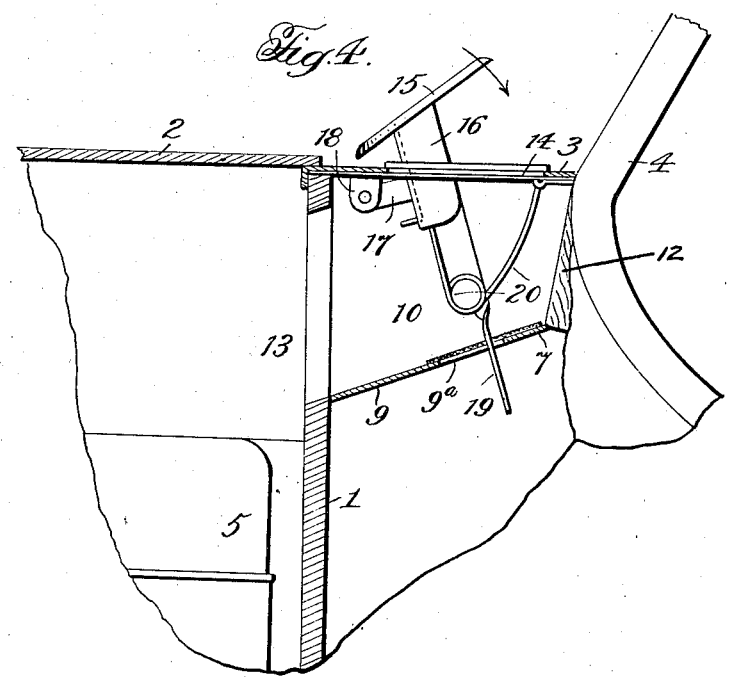
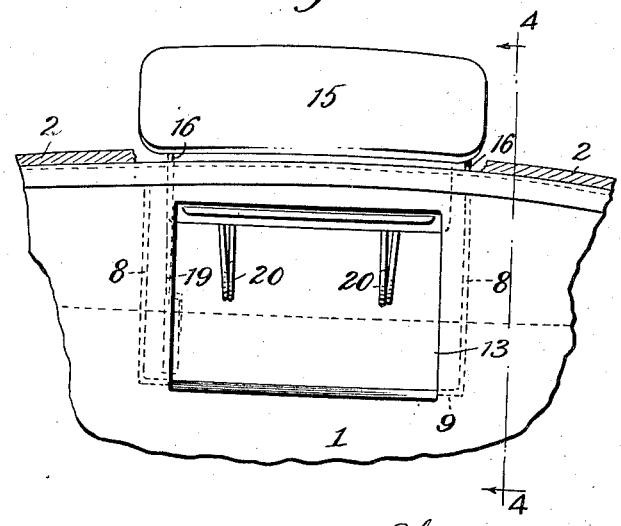

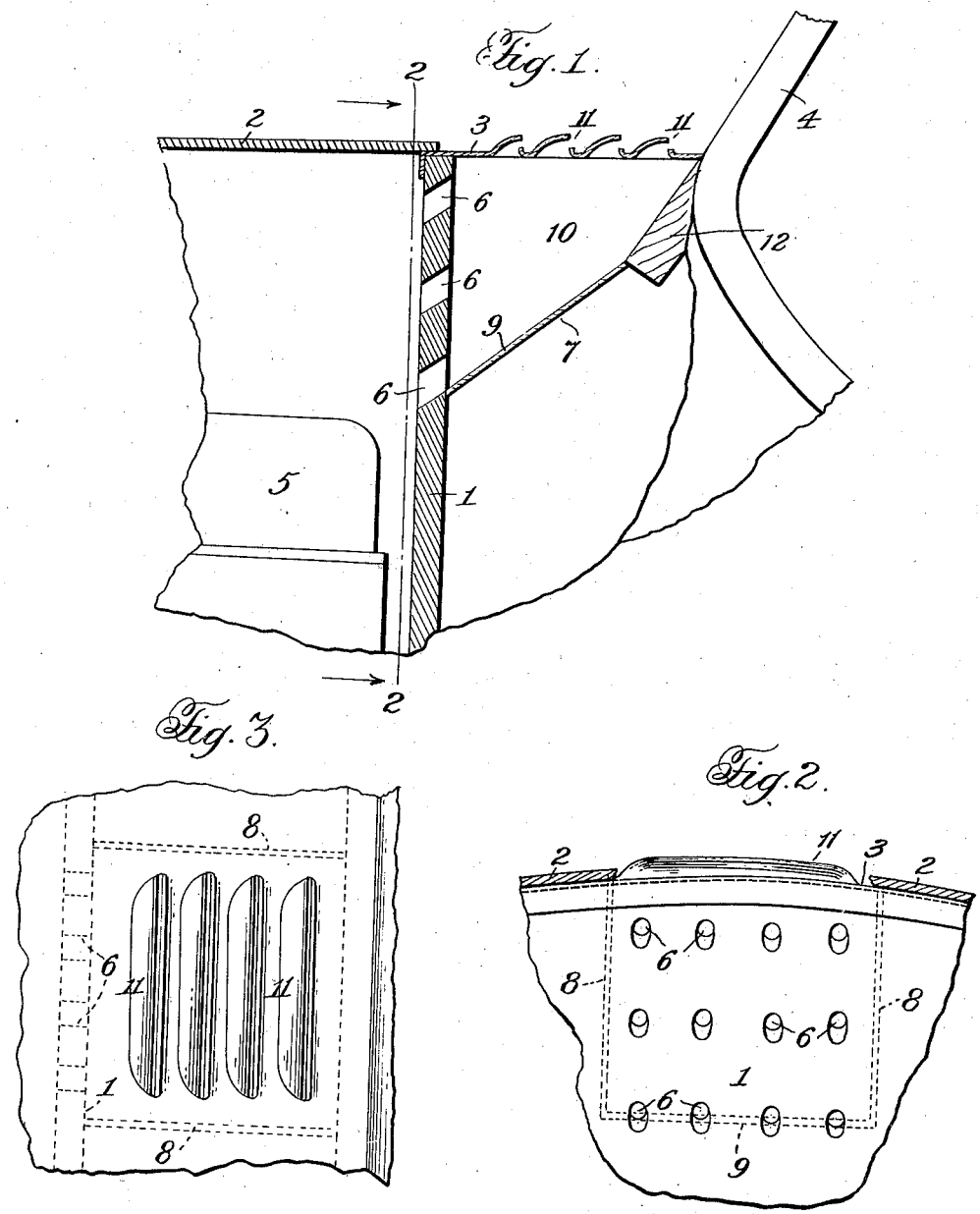

Patented Dec. 14, 1926.

1,610,917

UNITED STATES PATENT OFFICE.

WALTER J. BAUMGARTNER, OF LIMA, OHIO, ASSIGNOR TO THE GARFORD MOTOR TRUCK COMPANY, OF LIMA, OHIO, A CORPORATION OF OHIO.

ENGINE-VENTILATING DEVICE.

Application filed January 26, 1925. Serial No. 4,858.

This invention relates to motor vehicles, and more particularly to a means for directly removing the obnoxious gases and the hot air generated beneath the hood of an automobile.

In the present construction of automobiles air entering through the radiator is impelled rearwardly by the fan and discharged through the louvered sides of the hood and also downwardly beneath the floor boards, frequently raising the temperature of the floor boards to an uncomfortable degree, and in some cases of engine overheating producing spontaneous combustion, particularly where the floor boards have become saturated with grease.

It is therefore one of the principal objects of this invention to avoid these difficulties and to provide for the efficient cooling of the engine.

A further object of the invention is the provision of simple, inexpensive and effective means for removing the heated air which backs up against the dash board, and directly over the engine.

Further objects of the invention will appear as the following specific description is read in connection with the accompanying drawings, which form a part of this application, and in which:

Figure 1 is a fragmentary longitudinal section of an automobile showing one embodiment of my invention;

Figure 2 is a transverse section taken on the line 2—2 of Figure 1, immediately forward of the dash-board and showing in dotted lines the position of the flue.

Figure 3 is a detail top plan view.

Figure 4 is a view similar to Figure 4 showing another embodiment of this invention; and Figure 5 is a longitudinal section taken on the line 5—5 of Figure 4.

In the specific embodiment of the invention as disclosed in the drawings, I have shown in conventional form portions of an automobile body which are well known to those versed in the art, and I have designated the parts as follows:

1 indicates the usual dash-board, 2 the hood, 3 the cowl, 4 the windshield and 5 the engine located beneath the hood.

As illustrated in Figure 1, the dash-board is provided with a plurality of openings 6 which may be arranged in any suitable form, for instance, like that disclosed in Figure 1, which are preferably inclined so as to deflect the air passing therethrough upwardly toward the top of the cowl.

In the rear of the dash-board I secure a flue box of any suitable material, which is generally indicated at 7, and as shown is constructed of side walls 8, and a bottom wall 9. These walls, together with the upper portion of the cowl, form a flue 10 leading to the louvers 11 in the upper portion of the cowl.

The upper marginal edges of the walls 8 are secured in any preferred manner to the underside of the cowl, and the rear end of the flue is closed by a member indicated at 12. This member 12 may be either the instrument board or a separate and independent member which is attached to the cowl and to the side walls 8 and bottom wall 9 by some suitable air-tight connection.

As is noted from an inspection of Figure 1, the bottom wall 9 is inclined from its connection with the dash-board to its connection with the member 12 which not only serves to guide the air upwardly to the louvers 11 but also prevents the occupation of space needed by the driver of the vehicle; and further eliminates an unsightly projection below the instrument board.

In the type of construction illustrated in Figures 4 and 5 the dash-board is provided with a single relatively large opening 13 located above the plane of the top of the engine and immediately below the top of the hood and which opens in communication with the flue 10, formed as usual, by the side and bottom walls 8 and 9 of the flue box 7.

Instead of the louvers 11 shown in Figures 1 to 3 the cowl in this modification is provided with a single large opening 14 which may be closed by the ventilator cap or cover 15. This cover may be operated in any suitable manner but as shown in Figures 4 and 5 is provided with an arm 16, having laterally projecting ears 17 which are pivotally connected to the depending lugs 18 secured to the underside of the cowl 3. The cover 15 also has secured thereto an operating lever 19 which lies alongside of one of the walls 8 and projects below the lower wall 9 through a slot 9ᵃ in the bottom wall within easy reach of the operator of the vehicle.

Secured at one end to the underside of the cowl in the rear of the opening are controlling or holding springs 20, whose opposite ends are connected to the arms 16. These springs are so constructed and arranged that when the cover or cap is in elevated position and the fingers off center above their pivotal connection the springs will exert a tension to hold the cover in this position. Also when the cover is in lowered position and the fingers 17 off center below their pivotal connection the springs 20 will exert a tension to hold the cover closed. In other words when the fingers 17 are turned beyond horizontal in either direction by the manipulation of the lever 19 the springs will act to throw the cover to its limit of movement and maintain it in such position.

In practice I may find it desirable to employ other types of vents in the cowl instead of the louvers shown in Figure 1 or the hinged venting cover shown in Figure 4. Some opening however must be provided in the cowl disposing of the air passing through the flue 10 and it is optional whether this be a continuously open vent, or one which may be closed like the construction of Figure 4.

It will be seen that I have provided a simple inexpensive and conveniently installed means for withdrawing the heated air from above the engine which prevents excessive heat being developed and avoids the frequently serious consequences thereof. It will also be seen that by utilizing a member similar to an instrument board and inclining the bottom of the flue box from its connection with the dash-board to its connection with the instrument board or similar member, I eliminate all unsightly projections below the instrument board and at the same time avoid the occupying of space needed by the occupants of the vehicle and particularly by the driver thereof.

What I claim is:

1. In an engine ventilating device for motor vehicles the combination of a dash-board and a cowl, said dash board having an opening therethrough above the plane of the top of the engine and said cowl having a vent opening in its upper portion, and a flue box secured to said dash and cowl and with the cowl producing a flue adapted to take off the heated air above the engine through the cowl vent.

2. In an engine ventilating device for motor vehicles the combination of a dash-board and a cowl, said dash-board having an opening therethrough above the plane of the top of the engine and said cowl having a vent opening in its upper portion, a member similar to an instrument board, and a flue box connected to said dash-board and said member and with the cowl producing a flue in the rear of the dash-board adapted to taking off heated air generated by the engine through the cowl vent.

3. In an engine ventilating device for motor vehicles the combination of a dash-board and a cowl, said dash-board having an opening therethrough above the plane of the top of the engine and said cowl having a vent opening in its upper portion, a member similar to an instrument board, and a flue box connected to said dash-board and said member and with the cowl producing a flue in the rear of the dash-board adapted to taking off heated air generated by the engine through the cowl vent, said flue box including a bottom wall inclined upwardly from its connection with the dash-board to its connection with said member.

4. In an engine ventilating device for motor vehicles the combination of a dash-board and a cowl, said dash-board having a plurality of openings therein and said cowl being louvered in its upper portion and a flue box secured to said dash-board and cowl, and with said cowl producing a flue adapted to receive the heated air discharging through said openings and conduct the same to the louvers.

5. In an engine ventilating device for motor vehicles the combination of a dash-board and a cowl, said dash-board having an opening therethrough, a flue box secured to said dash-board and cowl and with the cowl producing a flue adapted to receive heated air from said opening, and louvers in the upper portion of said cowl constructed and arranged to receive the air from said flue and discharge said air rearwardly.

In testimony whereof I affix my signature.

WALTER J. BAUMGARTNER.